United States Patent Office 2,980,691
Patented Apr. 18, 1961

2,980,691

HALOGENATED METAL-PHTHALOCYANINE PRECURSORS

Robert Alan Brooks, Salem, N.J., assignor to E. I. du Pont de Nemours and Company, Wilmington, Del., a corporation of Delaware No Drawing. Filed July 20, 1954, Ser. No. 444,660

1 Claim. (Cl. 260—314.5)

This invention relates to novel organic compounds which are useful for the production of halogenated metal phthalocyanines. More particularly this invention relates to halogenated metal-phthalocyanine precursors wherein the halogen is chlorine or bromine while the metal is copper or nickel.

The precursor for a metal-phthalocyanine may be defined as an alcohol-soluble complex compound, containing more than 4 phthalonitrile units per molecule and which has no tinctorial qualities in itself, but which upon heating or upon being treated with reducing agents yields a metal-phthalocyanine. In the case of copper-phthalocyanine precursor, the compound may be expressed by the empirical formula $$Cu(C_8H_4N_2)_6 \cdot NH$$

wherein the six units in parenthesis may be looked upon as phthalonitrile units, the precursor being in fact capable of being formed by reacting 6 moles of phthalonitrile with 1 mole of a cupric salt in an inert organic solvent saturated with ammonia. Such a process is described and claimed in copending application of Barnhart and Skiles, Ser. No. 252,401 (Patent No. 2,772,284, issued November 27, 1956). According to an improvement of A. C. Stevenson (copending application Ser. No. 384,349, which issued November 27, 1956, as Patent No. 2,772,283), the reaction is facilitated by feeding into the mass an oxygen supplying gas at a specified rate, and the entire reaction is conducted at a temperature in the range of 55° to 95° C. A further improvement upon the process is disclosed in copending application of Perkins and Whelen, Ser. No. 430,400 (Patent No. 2,782,207, issued February 19, 1957). In copending application of R. A. Brooks, Ser. No. 332,513 (Patent No. 2,772,285, issued November 27, 1956), a copper-phthalocyanine precursor of similar properties and apparently the same constitution is obtained by heating in an inert solvent, at a temperature less than 90° C., 6 moles of 1,3-diiminoisoindoline and 1 mole of a copper salt such as cupric chloride or acetate.

The practical merits of the precursor reside in the fact that whereas copper-phthalocyanine itself is too insoluble to be applied by customary dyeing methods to textile fibers, the precursor can be readily applied to textile fibers from an organic-solvent dye bath, and can be readily converted on the fiber into copper-phthalocyanine by a simple heating of the fiber, or by treatment with reducing agents. The teachings of the above referred to copending applications of Barnhart and Skiles, Stevenson, and Brooks have been limited to the precursors for copper and nickel phthalocyanine, which, of course, can produce only the colors of copper and nickel phthalocyanine, respectively.

The objects of this invention are to widen the range of shades producible on textile fibers by means of the precursor technique and to improve the bleach fastness of such dyeings.

According to this invention novel precursor compounds of the copper and nickel phthalocyanine series are produced, which distinguish from the copper and nickel precursors of Barnhart and Skiles by having halogen, such as chlorine or bromine in the molecule, and by producing on the fiber dyes of shades varying from blue to green. More particularly, the novel compounds of my invention may be defined by the formula $$M(C_8H_{4-y}X_yN_2)_6 \cdot NH$$

wherein M designates copper or nickel, X stands for chlorine or bromine, while y is a numeral not greater than 2. The entire unit in parenthesis may be looked upon as a phthalonitrile unit in which one or two of the nuclear hydrogen atoms have been replaced by halogen.

As a matter of fact, my novel compounds may be prepared from halogenated phthalonitrile, a metal salt and ammonia, following essentially the teachings of said Barnhart and Skiles copending application, as improved further by said Stevenson or Perkins and Whelen copending application. This reaction may be illustrated by the equation:

$$6ClC_6H_3(CN)_2 + CuCl_2 + 3NH_3 \rightarrow Cu(C_8H_3ClN_2)_6 \cdot NH + 2NH_4Cl$$

They may also, however, be prepared by the general method of the above mentioned copending Brooks application, using as initial material halogenated 1,3-diiminoisoindoline (or a tautomer thereof), which in turn may be prepared by reacting halogenated phthalic anhydride or phthalimide with a solution of phosphorus pentachloride in phosphorus oxychloride to give an intermediate polychloro isoindolenine, then reacting the latter in a suitable liquid vehicle with ammonia.

The series of reactions in this case may be illustrated by the following typical series of equations:

(a) 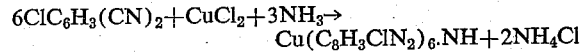

3-chlorophthalimide (A)     1,3,3,4-tetrachloro-isoindolenine (B)

(b) 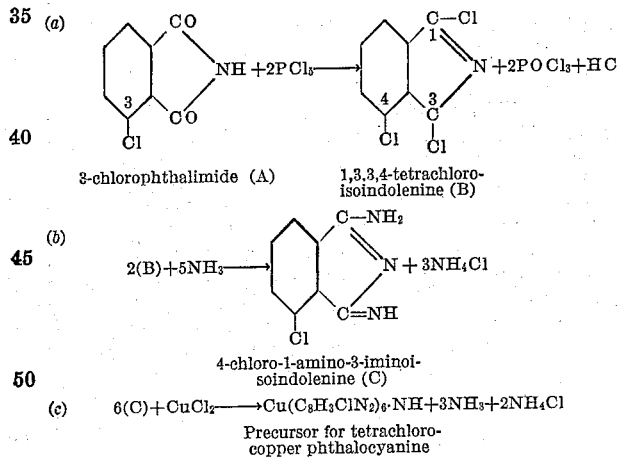

4-chloro-1-amino-3-iminoisoindolenine (C)

(c) $6(C) + CuCl_2 \longrightarrow Cu(C_8H_3ClN_2)_6 \cdot NH + 3NH_3 + 2NH_4Cl$ Precursor for tetrachloro-copper phthalocyanine In all the cases hereinabove, I prefer to employ as liquid vehicle for the reaction an inert, water-soluble organic solvent of the same types as are employed in the said Barnhart and Skiles application, or in said Stevenson or Brooks application; namely, dimethylformamide, dimethyl-acetamide; lower aliphatic alcohols such as methyl, ethyl, isopropyl and tert.-butyl; lower monoalkyl ethers of monoethylene or diethylene glycol (the "Cellosolves" and "Carbitols"); or mixtures of these. In the case of the phthalonitrile process above indicated, I may employ as catalyst urea, biuret, guanidine, piperidine, methyl glucamine, or triethanolamine; and in both processes I prefer to limit the reaction temperature to a value within the range of 45 to 95° C.

The products of this invention are useful in the dyeing and printing of textile fibers, producing green to blue shades. Although polychloro-copper phthalocyanine itself may be printed on textile fabric from "Aridye" and "Shopal" systems (using resin or starch binders, respectively) this pigment printing method has its limitations. The precursors of this invention, however, may be both dyed and printed; they can be blended with other dye types (e.g. vat dyes), and they satisfy a different and wider demand in the trade; they are also more firmly incorporated within the fiber.

Without limiting my invention the following examples are given to illustrate my preferred mode of operation. Parts mentioned are by weight.

*Example 1*

A mixture of 1.34 parts of anhydrous cupric chloride and 100 parts of the monoethyl ether of ethylene glycol was saturated with gaseous ammonia at 25° C. A fine, powdered mixture of 11.8 parts of 4,5-dichlorophthalonitrile and 0.5 part of methyl-glucamine was now added, and the entire mass was agitated while heating to 70° C. A slow stream of air was passed in, and agitation was maintained for two hours at 70° C. At the end of this period the reaction mixture was filtered at once. The filtrate, while still hot, was poured into 1000 parts of water to precipitate the product as a fine yellow-brown powder. This powder was isolated by filtration, washed with 1000 parts of water, and dried at 50° C. The product was a yellow-brown, free-flowing powder which was easily soluble in dimethyl formamide and in ethylene glycol monoethyl ether.

Reduction of 1 part of the above product with 1 part of ascorbic acid in 20 parts of boiling ethylene glycol monoethyl ether gave a blue-green pigment, which was identified as copper octa(4,5)chlorophthalocyanine.

*Example 2*

The procedure was as in Example 1, except that the 4,5-dichlorophthalonitrile was replaced by 9.7 parts of 4-chlorophthalonitrile. The precursor obtained did not differ in appearance from that of Example 1, but the tetrachloro copper phthalocyanine obtained on reduction of this precursor was a green-blue rather than a blue-green pigment.

*Example 3*

Seven (7.0) parts of 1,3,3,4-tetrachloro-isoindolenine, were added to 33.0 parts of dimethyl formamide, and ammonia gas was passed in at a temperature below 40° C. until the reaction mass was saturated with ammonia. The mass was then stirred for two hours during which time the 1,3,3,4-tetrachloro-isoindolenine was converted to 4-chloro-1-amino-3-iminoisoindolenine. One and a half (1.5) parts of copper sulfate monohydrate were then added, and the reaction mass was heated at 60–70° C. for 2 hours. Some bright blue crystals, presumably copper tetra(3)chlorophthalocyanine, formed which were removed by filtration. The filtrate was drowned in 500 parts of cold water. A tan colored product precipitated, which was filtered off and washed with 500 parts of cold water. The filter cake was slurried in 20 parts of methyl alcohol for 2 hours at 25–30° C., and the product was filtered off and washed with 2 parts of methyl alcohol and air dried.

This product when heated with ascorbic acid in boiling ethylene glycol monoethyl ether was converted to copper tetra(3)chlorophthalocyanine. When printed on cotton by the method described in copending application of C. F. Miller, Ser. No. 412,959, the novel product gave bluish green prints.

The 1,3,3,4-tetrachloro-isoindolenine employed in the above example as initial material was prepared as follows:

To a mixture of 80 parts of phosphorus oxychloride and 74 parts of phosphorus pentachloride at 110° C., 45.6 parts of 3-chloro-phthalimide were gradually added. The mass was heated at 110°–115° C. for 2 hours, then cooled to room temperature and vacuum distilled. The POCl₃ and PCl₅ distilled over in succession, and were followed by the reaction product, which distilled at 125° C. at 10 mm. pressure. On cooling, the product solidified to a white solid, melting at 89°–91° C., and whose chlorine analysis agreed with theory for tetrachloro-isoindolenine.

*Example 4*

The procedure was the same as in Example 3, except that the tetrachloro-isoindolenine therein named was replaced by 8 parts of 1,3,3,4,7-pentachloro-isoindolenine (prepared by the action of PCl₅ and POCl₃ on 3,6-dichloro-phthalimide). The product was the precursor for copper-octachloro-phthalocyanine, and on printing on cotton (by the method hereinabove referred to), produced a print of bluish-green shade.

It will be understood that the details of the above examples may be varied widely without departing from the spirit of this invention. Thus, when the copper sulfate employed in Examples 3 and 4 is replaced by an equivalent amount of nickel chloride, the corresponding nickel tetra- and octa-chlorophthalocyanine precursors are obtained, which yield the corresponding pigments upon treatment with reducing agents, either in substance or in the fiber. The nickel pigments are greener in shade than the corresponding copper compounds.

Likewise, when the 3-chloro- and 3,6-dichlorophthalimides used for reaction with PCl₅ or POCl₃ in Examples 3 and 4 are replaced by the analogous 3-bromo- and 3,6-dibromophthalimides, the corresponding bromo substituted precursors and phthalocyanine pigments are obtained.

In lieu of using chloro or bromo phthalimides in synthesizing the initial polyhalogen isoindolenines, the corresponding chloro or bromo derivatives of phthalic anhydride may be employed. In such a case, the intermediate, nuclearly halogenated 1-amino-3-iminoisoindolenine is prepared in the form of its nitrate salt according to the process described by Bayer in Example 17 of B.P. 698,049. The nitrate salt is then treated with an alkali to form the free base and the latter is converted to the precursor by the methods illustrated in Example 3 of this application.

Instead of using a single halogenated intermediate (phthalonitrile, phthalic anhydride or isoindolenine) in the synthesis, mixtures of several such intermediates of various halogen contents or of different natures or dispositions of the halogen atoms in the homocyclic nuclei may be employed, thereby producing precursor compounds of various total halogen content, and of different shades of dyeing within the range of blue to green. In such mixed synthesis, part of the halogenated intermediate may also be replaced by non-halogenated intermediate or by fully halogenated intermediate (say, tetrachlorophthalonitrile). But in all such cases I find that the synthesis proceeds more smoothly if the mixture is chosen so that the resultant precursor will have a halogen analysis of not over 12 halogen atoms per molecule. Accordingly, the preferred novel precursor compounds producible according to this invention may be defined by the empirical formula $$MC_{48}H_{25-z}X_zN_{13}$$

wherein M is a metal of the group consisting of copper and nickel, X is a halogen of the group consisting of chlorine and bromine, while z is a number not less than 1 and not greater than 12.

In Example 1 above, methyl glucamine was employed as catalyst. Essentially the same results, however, may also be obtained by using one of the other catalysts indicated hereinabove, for instance, urea, biuret, guanidine, piperidine or triethanolamine.

Numerous other variations in detail will be readily apparent to those skilled in this art.

The novel compounds of this invention are readily converted to the corresponding polyhalogen metal phthalocyanines by heating in the absence of reducing agents at a temperature above 120° C., or by heating at lower temperatures in the presence of reducing agents typified by sodium or potassium bisulfite, sodium hydrosulfite, ascorbic acid, etc.

In the application of the novel compounds to textile fibers, dyeing is preferably done from an organic padding bath at a temperature below 110° C., the padding bath containing a reducing agent whose redox potential is not less than −1.00 volt. As preferred solvents for the dye bath may be mentioned the "Cellosolves" and "Carbitols," while the number of available reducing agents is vast and is typified by numerous examples in the aforementioned application of Skiles.

Printing on the other hand is preferably achieved by the aid of a printing paste containing, beside the color-precursor and the customary thickening paste, a solvent such as a "Carbitol," triethanolamine, and optionally sodium sulfite. The printing process is then followed by drying for about 1 minute at 105° to 110° C. and aging in neutral or acid steam for about 5 minutes.

I claim as my invention:

The process of producing a metal phthalocyanine precursor containing 6 phthalonitrile units and from 6 to 12 halogen atoms per molecule, which comprises reacting a halogenated phthalonitrile having not more than 2 halogen atoms per molecule with a metal salt of the group consisting of cupric salts and nickel salts, the reaction being effected by heating the two reactants in a water-soluble, inert organic liquid saturated with ammonia, in the presence of oxygen in the gaseous state, in the further presence of a catalyst selected from the group consisting of urea, biuret, guanidine, piperidine, methyl glucamine and triethanolamine, and at a temperature between 45° and 95° C.

References Cited in the file of this patent

UNITED STATES PATENTS

| | | |
|---|---|---|
| 2,549,842 | Moser | Apr. 24, 1951 |
| 2,681,348 | Brooks | June 15, 1954 |
| 2,683,643 | Baumann et al. | July 13, 1954 |
| 2,701,252 | Vallmann et al. | Feb. 1, 1955 |
| 2,727,043 | Rosch et al. | Dec. 3, 1955 |